United States Patent
Kato et al.

(10) Patent No.: US 10,449,887 B2
(45) Date of Patent: Oct. 22, 2019

(54) CARGO CARRYING VEHICLE

(71) Applicant: SINFONIA TECHNOLOGY CO., LTD., Tokyo (JP)

(72) Inventors: Masahiko Kato, Minato-ku (JP); Yosuke Yamada, Tokyo (JP)

(73) Assignee: Sinfonia Technology Co., Ltd., Tokyo (JP)

( * ) Notice: Subject to any disclaimer, the term of this patent is extended or adjusted under 35 U.S.C. 154(b) by 0 days.

(21) Appl. No.: 15/565,634

(22) PCT Filed: Feb. 4, 2016

(86) PCT No.: PCT/JP2016/053429
§ 371 (c)(1),
(2) Date: Oct. 10, 2017

(87) PCT Pub. No.: WO2016/167009
PCT Pub. Date: Oct. 20, 2016

(65) Prior Publication Data
US 2018/0072211 A1 Mar. 15, 2018

(30) Foreign Application Priority Data
Apr. 13, 2015 (JP) ................................. 2015-081791

(51) Int. Cl.
*B60P 1/52* (2006.01)
*B60P 1/02* (2006.01)
(Continued)

(52) U.S. Cl.
CPC .................. *B60P 1/52* (2013.01); *B60P 1/02* (2013.01); *B60P 3/14* (2013.01); *B64F 1/32* (2013.01); *B65G 1/00* (2013.01); *B65G 69/24* (2013.01)

(58) Field of Classification Search
CPC .. B60P 1/02; B60P 1/52; B60P 1/4414; B60P 3/14; B60P 1/44; B60P 1/025;
(Continued)

(56) References Cited

U.S. PATENT DOCUMENTS 2,987,205 A * 6/1961 Draxler ................... B66F 9/141
 414/497
3,712,495 A * 1/1973 Carder ...................... B60P 1/52
 414/503
(Continued)

FOREIGN PATENT DOCUMENTS

GB  2113175 A * 8/1983 ................ B64F 1/32
JP  S62-197696 U  12/1987
(Continued)

OTHER PUBLICATIONS

Extended European Search Report for Application No. 16779801.6, dated Sep. 25, 2018 in 13 pages.

*Primary Examiner* — Glenn F Myers
(74) *Attorney, Agent, or Firm* — Knobbe, Martens, Olson & Bear, LLP

(57) ABSTRACT

Provided is a cargo carrying vehicle including; an elevating table 2 elevatable in the vertical direction; a plurality of rotating bodies 31 located on the elevating table 2 and configured to rotate so as to carry a cargo C in a conveyance direction X that is a direction toward a loading-unloading part of an aircraft; and a support 32 configured to support the plurality of rotating bodies 31, wherein the support 32 and the plurality of rotating bodies 31 constitute the conveying unit 3, and the conveying unit 3 is movable on the elevating table 2 in a position adjusting direction Y that is a direction intersecting the vertical direction and the conveyance direction.

12 Claims, 13 Drawing Sheets

(51) Int. Cl.
*B60P 3/14* (2006.01)
*B64F 1/32* (2006.01)
*B65G 69/24* (2006.01)
*B65G 1/00* (2006.01)

(58) Field of Classification Search
CPC .......... B60P 1/649; B60P 1/6436; B64F 1/32; B64F 1/368; B64F 1/31; B65G 1/023; B65G 69/24; B65G 13/02; B65G 13/065; B65G 13/11; B65G 13/12; B65G 13/04; B65G 13/06; B65G 13/07; B65G 13/071; B65G 69/22; B65G 37/005; B65G 37/02; B65G 39/12; B65G 39/18; B65G 39/20; B65G 41/007; B65G 41/003; B65G 67/04; B21D 37/147; B64D 2009/006; B60R 5/04

See application file for complete search history.

(56) References Cited

U.S. PATENT DOCUMENTS

| | | | | |
|---|---|---|---|---|
| 3,735,885 A | * | 5/1973 | Comfort | B64F 1/32 414/503 |
| 3,854,610 A | | 12/1974 | Carder | |
| 3,944,096 A | * | 3/1976 | Carder | B60P 1/02 414/345 |
| 4,093,084 A | * | 6/1978 | Ringer | B65G 17/345 104/88.02 |
| 4,538,950 A | * | 9/1985 | Shiomi | B23Q 7/1426 104/307 |
| 4,715,766 A | * | 12/1987 | Gebhardt | B65G 1/0485 198/468.6 |
| 5,269,641 A | * | 12/1993 | Cochran | B60P 1/02 414/345 |
| 5,630,694 A | * | 5/1997 | Ihara | B64F 1/32 244/137.1 |
| 8,246,285 B2 | * | 8/2012 | Maguin | B64F 1/32 182/113 |
| 8,500,384 B2 | * | 8/2013 | Quirion | B64F 1/32 244/137.1 |
| 2011/0139933 A1 | | 6/2011 | Quirion | |

FOREIGN PATENT DOCUMENTS

| | | |
|---|---|---|
| JP | S63-173738 A | 7/1988 |
| JP | H02-147520 A | 6/1990 |
| JP | H06-247204 A | 9/1994 |
| JP | H08-151131 A | 6/1996 |
| JP | 2013-107520 A | 6/2013 |
| WO | 2013/077223 A1 | 5/2013 |

* cited by examiner

CONTAINER WHEN LOCATED AT THE CENTER

CONTAINER WHEN LOCATED ON THE LEFT

CONTAINER WHEN LOCATED ON THE RIGHT

CARGO CARRYING VEHICLE

CROSS-REFERENCE TO RELATED APPLICATION

This application is the U.S. National Phase under 35. U.S.C. § 371 of International Application PCT/JP2016/053429, filed Feb. 4, 2016, which claims priority to Japanese Patent Application No. 2015-81791, the disclosure of which is incorporated herein by reference in its entirety.

FIELD

The present invention relates to a cargo carrying vehicle used, for example, in airports.

BACKGROUND

There is a cargo carrying vehicle used when cargo is loaded into and unloaded from a cargo hold of an aircraft, for example, in airports. The cargo carrying vehicle is self-propelled and is capable of carrying cargo (housed in a container or loaded on a pallet) while being located adjacent to the loading-unloading port of the cargo hold of the aircraft, and such a cargo carrying vehicle is disclosed, for example, in Patent Literature 1.

The cargo carrying vehicle disclosed in Patent Literature 1 includes a front platform located closest to the loading-unloading port of the aircraft when the cargo is carried into the aircraft. This front platform is configured to be elevatable by being supported by a scissor link mechanism (which is constituted by allowing rod-shaped bodies extending in oblique directions to intersect each other into an X-shape and is elevatable by changing the intersecting angle of the rod-shaped bodies in the intersecting portion) from below. The cargo is carried into the loading-unloading port through above the front platform together with the container or the pallet. Front and rear rollers capable of carrying the cargo in the front-rear direction with respect to the loading-unloading port project on the upper surface of the front platform, and the cargo is placed on the front and rear rollers to be carried.

Here, depending on the positional relationship between the cargo on the front platform and the loading-unloading port, there may be cases where it is necessary to adjust the position by moving the cargo in the left-right direction. Therefore, a lateral movement mechanism is provided in the front platform. The lateral movement mechanism is normally located below the front and rear rollers and is provided to be vertically movable by being hydraulically driven so as to project upwardly over the front and rear rollers when necessary. The lateral movement mechanism includes left and right rollers configured to rotate so as to be capable of moving luggage in the left-right direction. In the case where it is necessary to move the cargo in the left-right direction, the cargo is placed on the left and right rollers and is lifted from the front and rear rollers by allowing the left and right rollers of the lateral movement mechanism to project upwardly over the front and rear rollers, and then the left and right rollers are rotated to move the cargo in the left-right direction.

However, in the lateral movement mechanism configured as above, it is necessary to lift the cargo from the front and rear rollers, then move the cargo in the left-right direction, and thereafter move the cargo downwardly so as to contact the front and rear rollers, every time when it is necessary to move the cargo in the left-right direction. Such a sequence of actions takes a time, and therefore the working efficiency when carrying cargo is not good.

CITATION LIST

Patent Literature

Patent Literature 1: JP 2013-107520 A

SUMMARY

Technical Problem

It is therefore an object of the present invention to provide a cargo carrying vehicle with good working efficiency when carrying cargo.

Solution to Problem

A cargo carrying vehicle according to an example of the configuration of the present invention is capable of carrying cargo to a loading-unloading part provided in an object to be loaded with the cargo by being located adjacent to the loading-unloading part, the cargo carrying vehicle including: an elevating table elevatable in the vertical direction; a plurality of rotating bodies located on the elevating table and configured to rotate so as to carry the cargo on the elevating table in a conveyance direction that is a direction toward the loading-unloading part; and a support configured to support the plurality of rotating bodies, wherein the support and the plurality of rotating bodies constitute a conveying unit, and the conveying unit is movable on the elevating table in a position adjusting direction that is a direction intersecting the vertical direction and the conveyance direction.

The cargo carrying vehicle can further include a drive unit connected to the support and configured to generate a driving force to move the support in the position adjusting direction and to hold a position in the position adjusting direction of the support on the elevating table after the support is moved.

The cargo carrying vehicle can further include a pair of guides opposed to each other in the position adjusting direction at a spacing larger than a width dimension of the cargo and arranged at positions opposed to lateral surfaces of the cargo located on the support.

The cargo carrying vehicle can be configured so that the elevating table includes a ball mat in which a plurality of spheres supported rotatably around an entire circumference are arranged at the same height, and upper end positions of the plurality of spheres of the ball mat are located lower than upper ends of the rotating bodies.

DESCRIPTION OF EMBODIMENT

The present invention will be described by way of an embodiment with reference to the drawings. In the following description, the front side means the direction facing an aircraft A, and the back side means the direction with the aircraft A behind. Further, the left-right direction Y means the left-right direction in the state of facing the front side.

Figure 1:
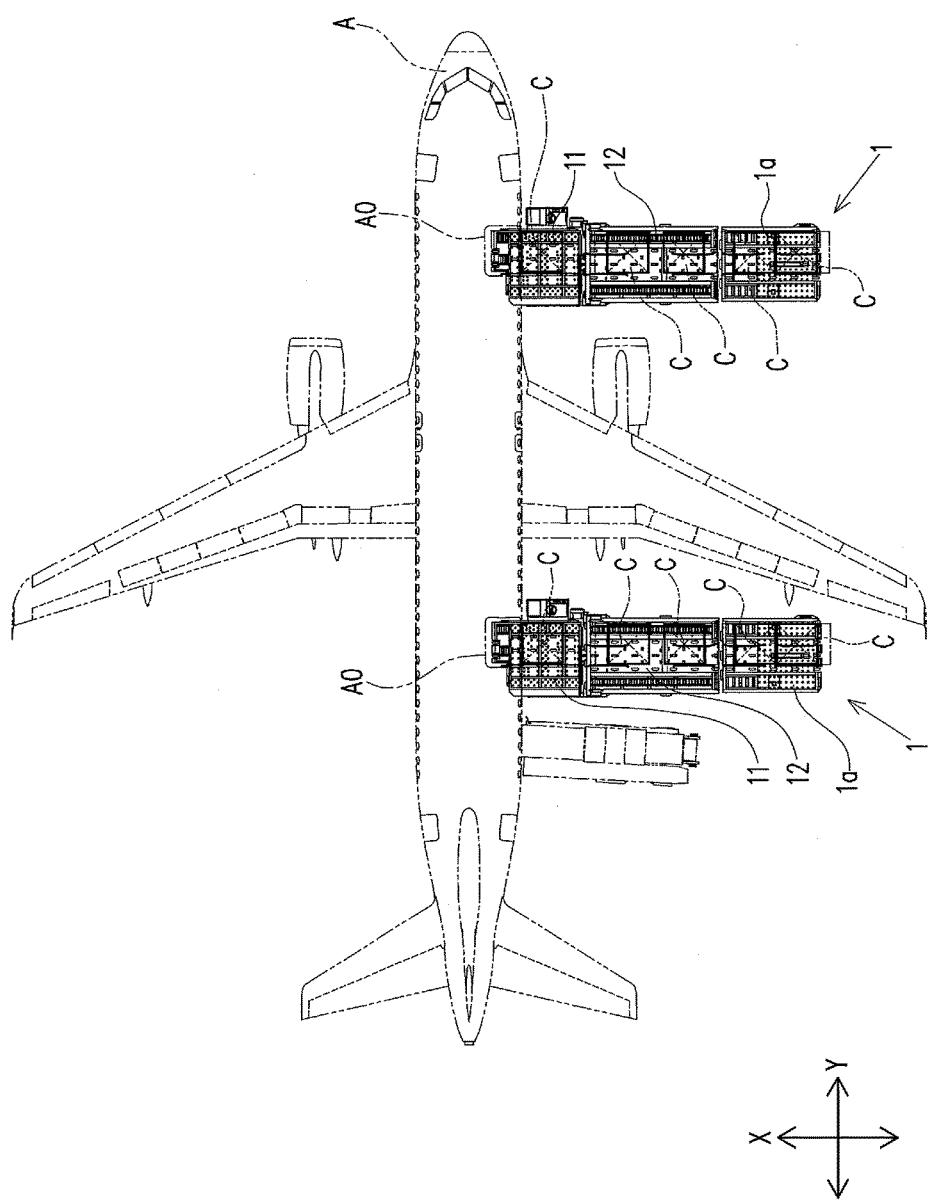
FIG. 1 is a plan view showing an example of a cargo carrying vehicle or the like in use according to an embodiment of the present invention.

A cargo carrying vehicle 1 of this embodiment is a self-propelled vehicle called "container/pallet loader" and can carry cargo C to a loading-unloading port AO serving as a loading-unloading part of a cargo hold provided in the aircraft A serving as an object to be loaded with the cargo by being located adjacent to the loading-unloading port AO, as shown in FIG. 1. The cargo C that is carried by the cargo carrying vehicle 1 of this embodiment is housed in a container or loaded on a pallet. However, there is no limitation to such states, and for example, single cargo itself or a storage bag in which a plurality of cargoes are housed also can be the object to be carried by the cargo carrying vehicle 1. Hereinafter, for convenience of description (not intended to limit the invention), the description is given under the assumption that the object to be carried is a container, and the container itself is the cargo C.

Figure 2:
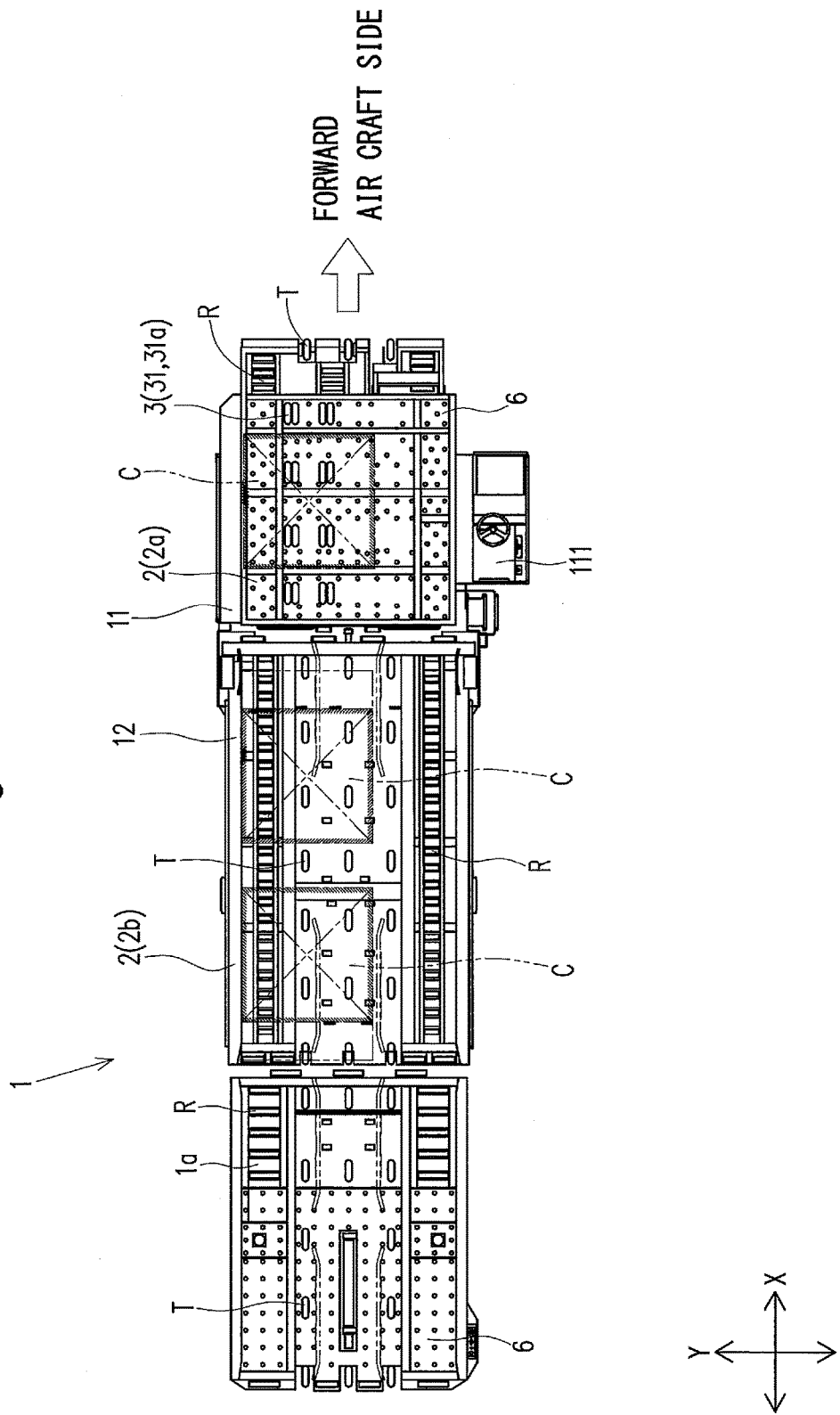
FIG. 2 is a plan view showing the cargo carrying vehicle.
Figure 3:
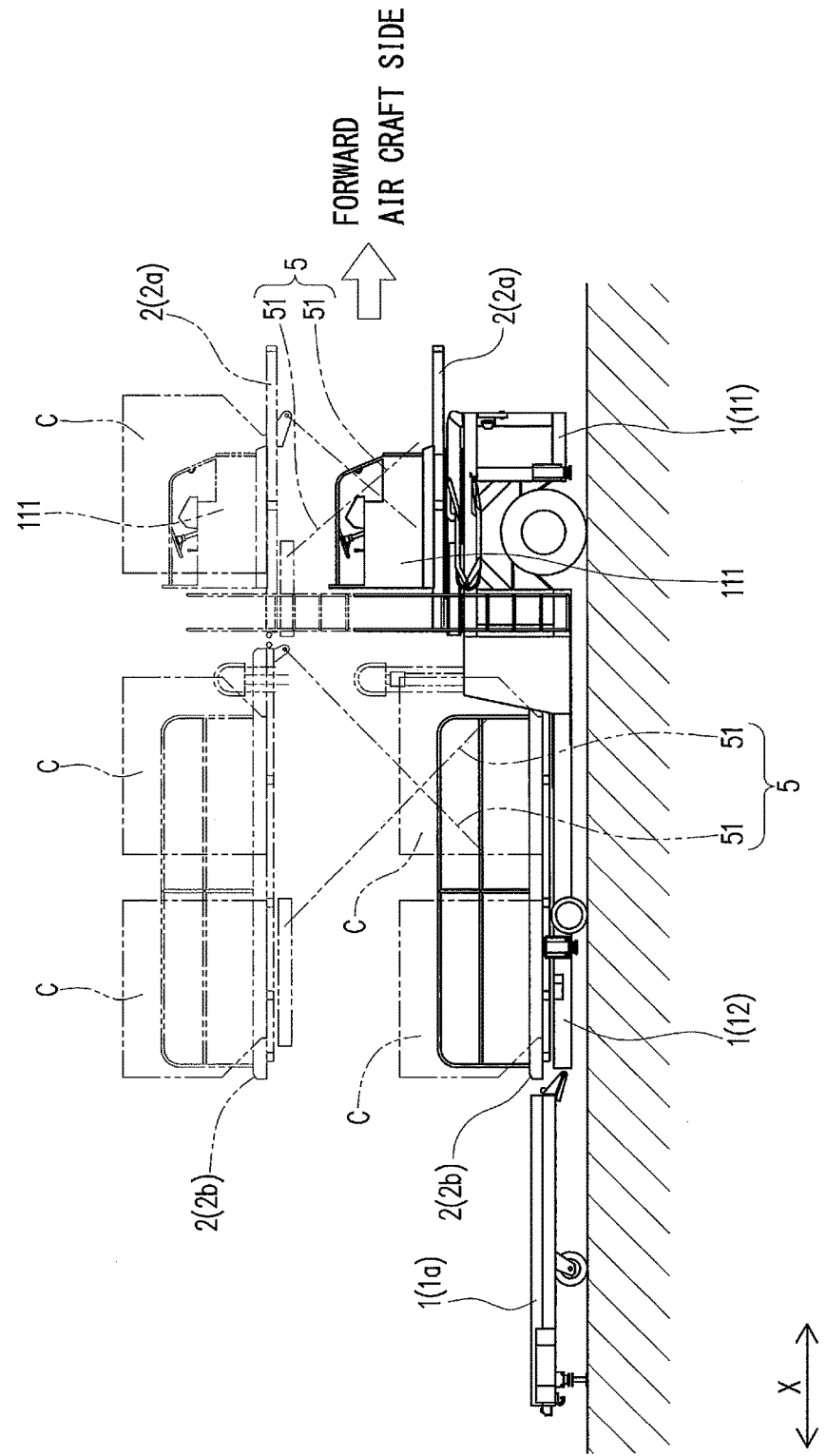
FIG. 3 is a side view showing the cargo carrying vehicle.

As shown in FIG. 2 and FIG. 3, the cargo carrying vehicle 1 includes a front platform 11 (referred to also as "bridge platform") on the front side and a rear platform 12 (referred to also as "main platform") on the back side. Further, the cargo carrying vehicle 1 of this embodiment further includes an extended cart 1a (referred to also as "extension dolly") coupled to the back of the rear platform 12.

The container C is first moved to the extended cart 1a from another carrying cart (not shown) than the cargo carrying vehicle 1, which is positioned behind the extended cart 1a. The container C moved to the extended cart 1a is carried from the extended cart 1a to the rear platform 12 and then from the rear platform 12 to the front platform 11, and subsequently is loaded from the front platform 11 into the cargo hold of the aircraft A.

A driver's cabin 111 is provided on a lateral side (on the right side in this embodiment) of the front platform 11. The driver's cabin 111 is provided on an elevating table 2a, which will be described below, of the front platform 11, so that the driver (operator) has easy access to the container C on the front platform 11. This embodiment is configured so that one container C is placed on the front platform 11, and a plurality of units, specifically, two units of containers C aligned in the front-rear direction are placed on the rear platform 12, but loading of the containers C on the platforms can be variously changed depending on the setting of how to carry the containers C.

A plurality of conveying rollers R or carrying tires T project on the upper surfaces of the front region (in front of a conveying unit 3) of the front platform 11, the rear platform 12, and the extended cart 1a. These conveying rollers R or the like rotate so as to carry the containers C in the front-rear direction X. A ball mat 6, which will be described below, is provided in the substantially rear half region of the extended cart 1a so as to support the containers C in the case where the containers C are deflected or inclined on the extended cart 1a, so that the containers C are prevented from hindering the conveyance by rubbing the upper surfaces of the rear platform 12 and the extended cart 1a.

As shown in FIG. 3, the front platform 11 and the rear platform 12 respectively include elevating tables 2 (2a and 2b) that are separately elevatable in the vertical direction. Each of the elevating tables 2 (2a and 2b) is supported by elevating mechanisms that are stretchable in the vertical direction. Specifically, each of the elevating tables 2 (2a and 2b) is supported by a pair of scissor link mechanisms 5 that are spaced apart from each other and opposed to each other in the left-right direction Y from below. Each of the scissor link mechanisms 5 is a known mechanism that is constituted by intersecting two support posts 51 extending in oblique directions into an X-shape and is configured to be elevatable by changing the intersection angle of the support posts 51 in the intersecting portion. The elevating tables 2 (2a and 2b) in the front platform 11 and the rear platform 12 can be elevated by the scissor link mechanisms 5 corresponding to the change in the intersection angle. Therefore, the upper surfaces of the elevating tables 2 (2a and 2b) can be coincided with the floor surface of the loading-unloading port AO of the aircraft A in a horizontal state. Therefore, luggage can be easily carried to the loading-unloading port AO by changing the height of the elevating tables 2 (2a and 2b) corresponding to the model of the aircraft A. The elevating mechanisms are not limited to the scissor link mechanisms 5 and may be mechanisms configured to elevate the elevating tables 2 (2a and 2b), for example, by driving belts or chains. Each of the elevating tables 2 (2a and 2b) includes a rail part 21 (see FIG. 7 to FIG. 9) composed of a member (channel material in this embodiment) extending in the left-right direction Y. The rail part 21 supports the conveying unit 3, which will be described below, so as to be movable in the left-right direction Y. Of the elevating tables 2, the elevating table 2a of the front platform 11 will be described in the following description.

Figure 4:
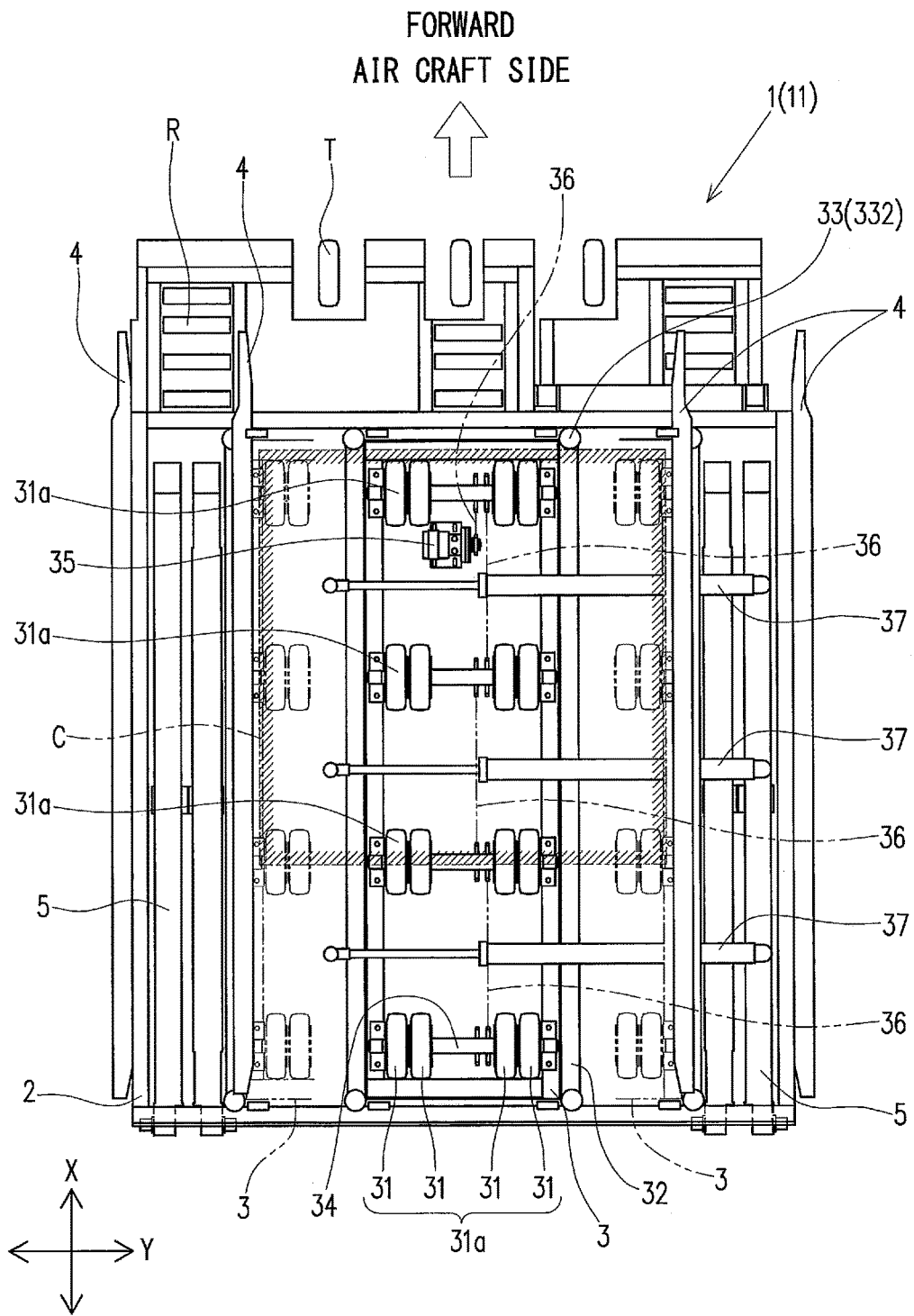
FIG. 4 is a plan view showing a front platform according to an embodiment of the present invention while omitting a ball mat.
Figure 5:
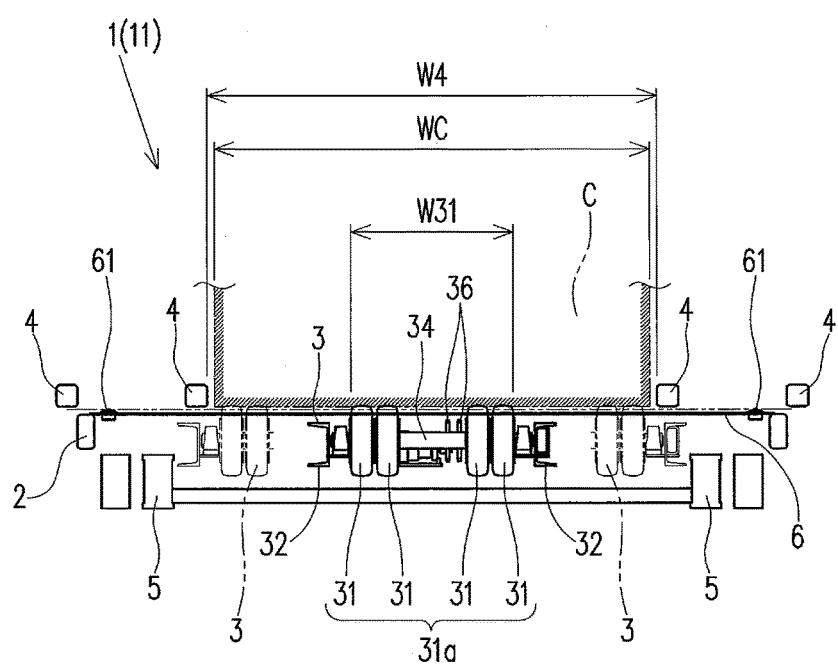
FIG. 5 is a rear view (viewed from the back) showing the front platform.
Figure 6:
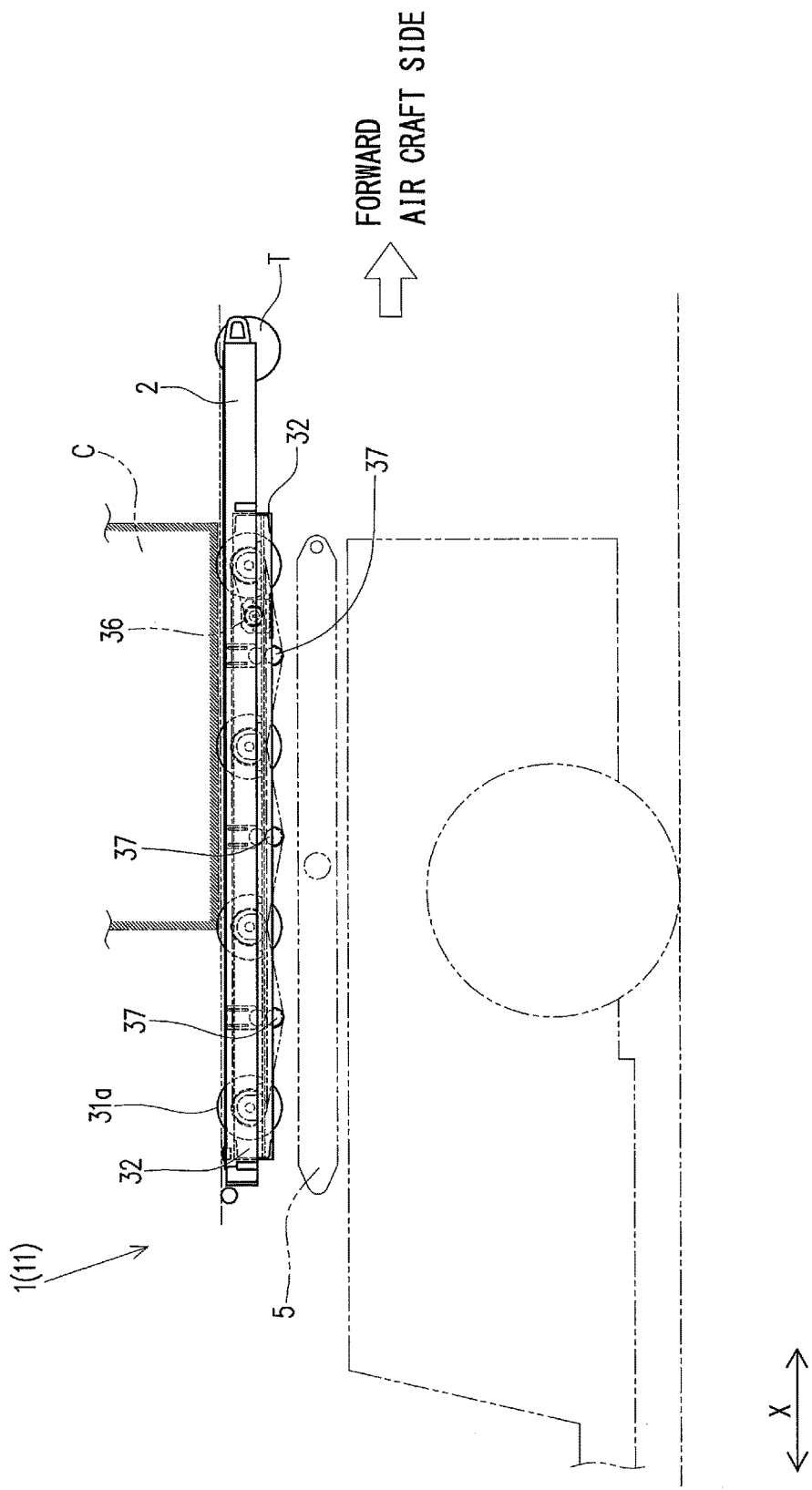
FIG. 6 is a right side view showing the front platform.

The front platform 11 includes the conveying unit 3. As shown in FIG. 4 to FIG. 6, the conveying unit 3 includes a plurality of rotating bodies (a plurality of tires 31 in this embodiment) located on the elevating table 2a of the front platform 11 and configured to carry the container C forward (in a direction in which the container C enters the loading-unloading port AO (this direction will be hereinafter referred to as "conveyance direction")) and backward (in a direction in which the container C exits the loading-unloading port AO). The plurality of tires 31 rotate so that axes 31C serving as the rotational centers extend in a direction R31 along the left-right direction Y (see FIG. 11B). The conveying unit 3 includes a support 32 configured to support the plurality of tires 31.

Figure 7:
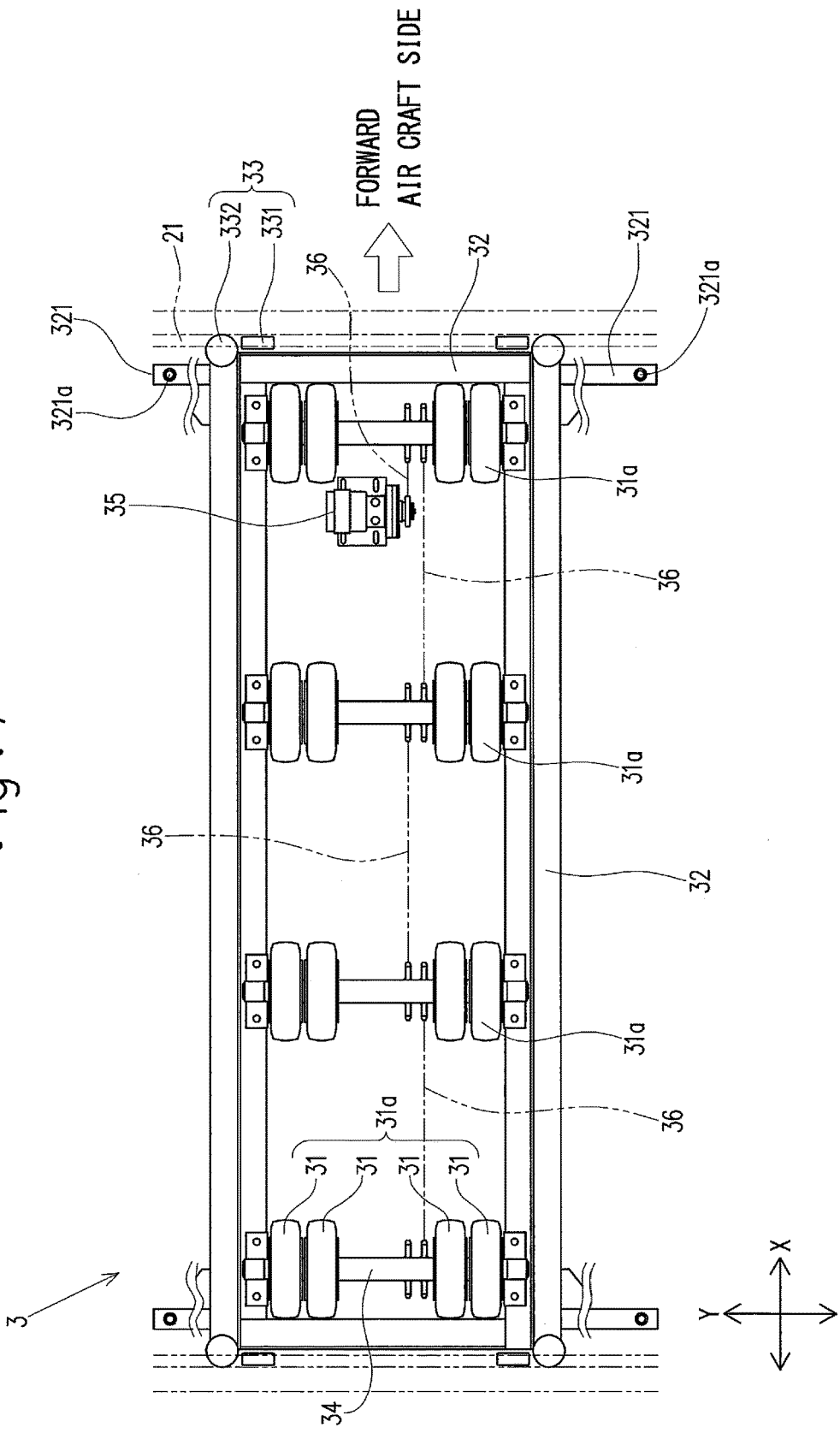
FIG. 7 is a plan view showing a conveying unit according to an embodiment of the present invention.
Figure 8:
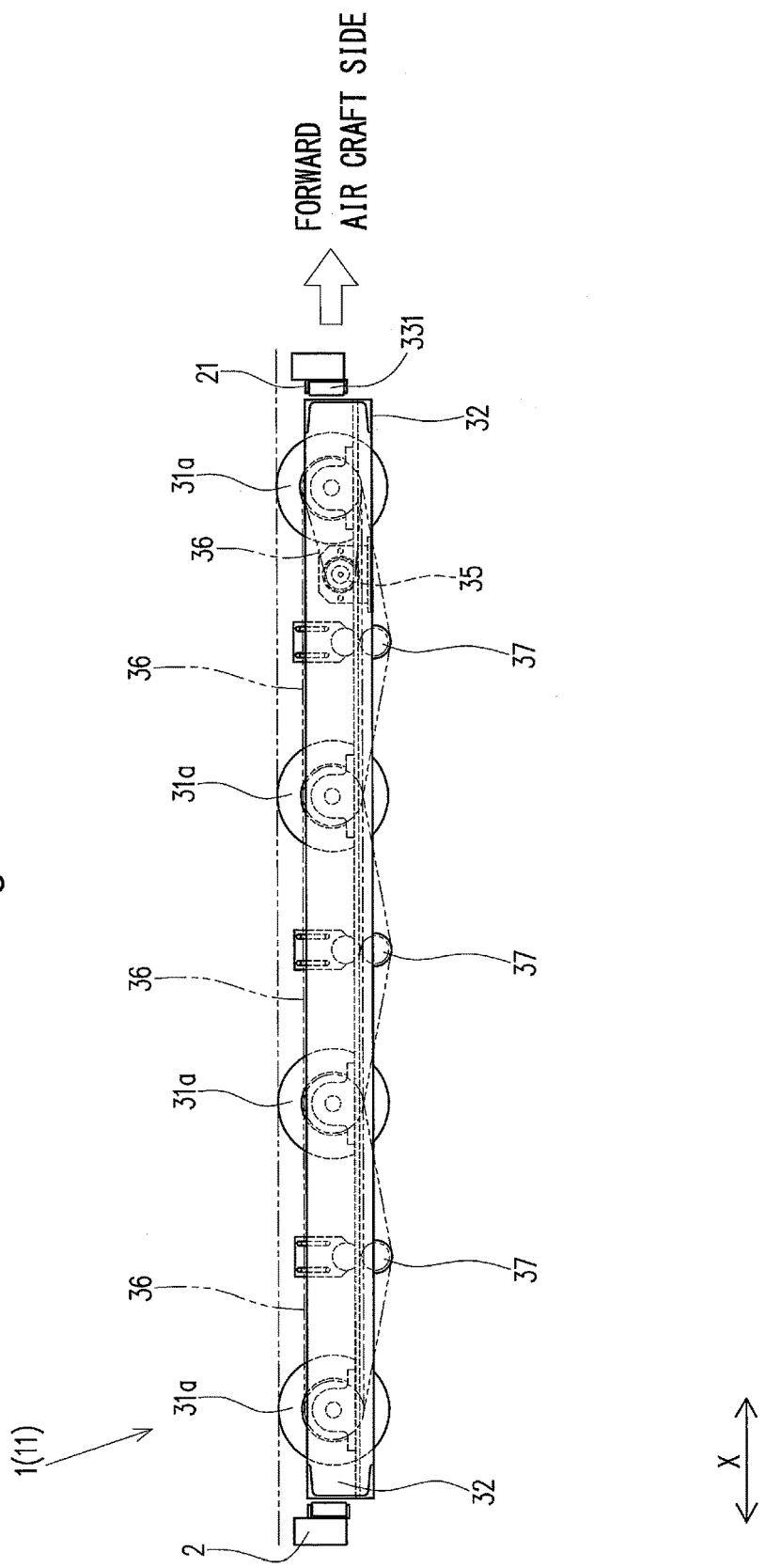
FIG. 8 is a right side view showing the conveying unit.
Figure 9:
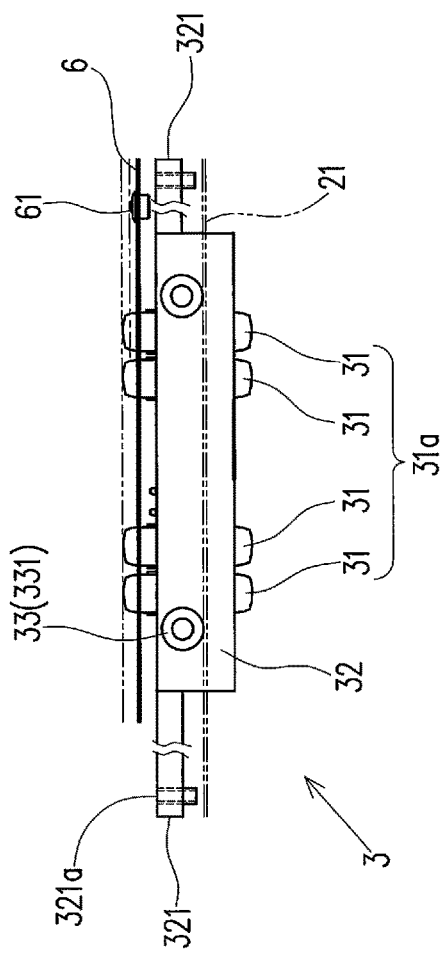
FIG. 9 is a front view (viewed from the front) showing the conveying unit.

As shown in FIG. 7 to FIG. 9, the support 32 of this embodiment is a frame having a rectangular shape in plan view and elongated in the front-rear direction X. The support 32 of this embodiment is made of steel. On the front and rear edges of the support 32, wheels 33 are provided along the rail part 21 of the elevating table 2a. The rail part 21 of this embodiment is constituted by a channel material. In the wheels 33 of this embodiment, a running wheel 331 with its axle extending in the front-rear direction and a guide wheel 332 with its axle extending in the vertical direction are provided as one set. Four sets of running wheels 331 and guide wheels 332 are provided at the corners of the rectangle. The running wheels 331 can move in the left-right direction Y while transferring the loads of the conveying unit 3 and the container C on the conveying unit 3 to the elevating table 2 (the rail part 21 in this embodiment). The guide wheels 332 restrict the displacement of the conveying unit 3 by rotating along the inner surface of the rail part 21. The guide wheels 332 guide the conveying unit 3 so as to move reliably in the left-right direction Y.

Further, as shown in FIG. 7, guide mounting brackets 321 extend from the front part and the rear part of the support 32 to the left and right. Each of the guide mounting brackets 321 includes an insertion hole 321a at the distal end. A guide 4, which will be described below, is mounted in the insertion hole 321a.

A plurality of sets (four sets in this embodiment) of tire units 31a are located inside the support 32. The tire units 31a of this embodiment are arranged at equal intervals in the front-rear direction. Each of the tire units 31a includes a plurality (four in this embodiment) of tires (rubber tires in this embodiment) 31 aligned in the left-right direction Y. The four tires 31 are fixed to one shaft 34 extending in the left-right direction Y while being separated into two sets of two tires (double tires) 31 on the left and right sides. The shaft 34 is coupled to a hydraulic motor 35 by a coupling mechanism (a chain 36 in this embodiment), so as to rotate the tires 31 by transmitting the driving force of the hydraulic motor 35 to the tires 31 via the chain 36.

The conveying unit 3 is movable on the elevating table 2a in the position adjusting direction that is the horizontal direction intersecting the vertical direction and the conveyance direction. The position adjusting direction in this embodiment is the left-right direction Y that is the horizontal direction orthogonal to the vertical direction and the conveyance direction. The position adjusting direction may be a direction other than the left-right direction Y, but the following description is given under the assumption that the position adjusting direction is the left-right direction Y.

For moving the conveying unit 3 in the left-right direction Y as described above, a drive unit that generates the driving force to move the support 32 in the left-right direction Y and maintains the position of the support 32 in the left-right direction Y on the the elevating table 2a after the support 32 is moved is connected to the support 32. The drive unit in this embodiment is an oil pressure cylinder 37. A plurality (in this embodiment, three at equal intervals) of oil pressure cylinders 37 are provided in the front-rear direction X. The oil pressure cylinders 37 may be directly connected to the elevating table 2a or may be indirectly connected thereto. The oil pressure cylinders 37 of this embodiment are arranged so that their longitudinal directions extend along the left-right direction Y, and their proximal end portions are fixed to the elevating table 2a. Further, their distal end portions are fixed to the support 32. As the oil pressure cylinders 37 stretch by being supplied with hydraulic oil, the conveying unit 3 can be moved in the left-right direction Y.

Figure 10:
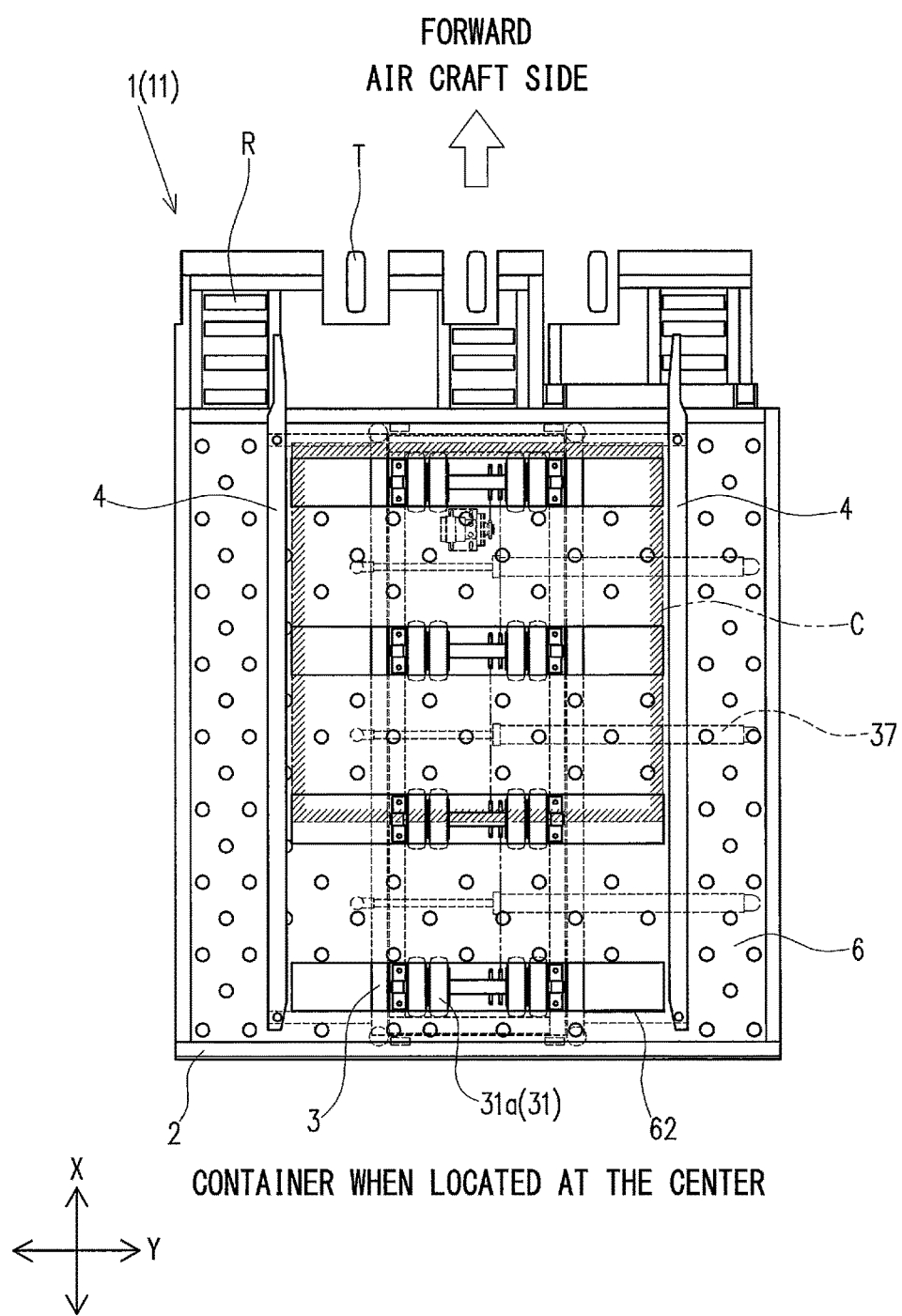
FIG. 10 is a plan view showing a front platform according to an embodiment of the present invention, in which cargo (container) is located at the center.
Figure 11A:
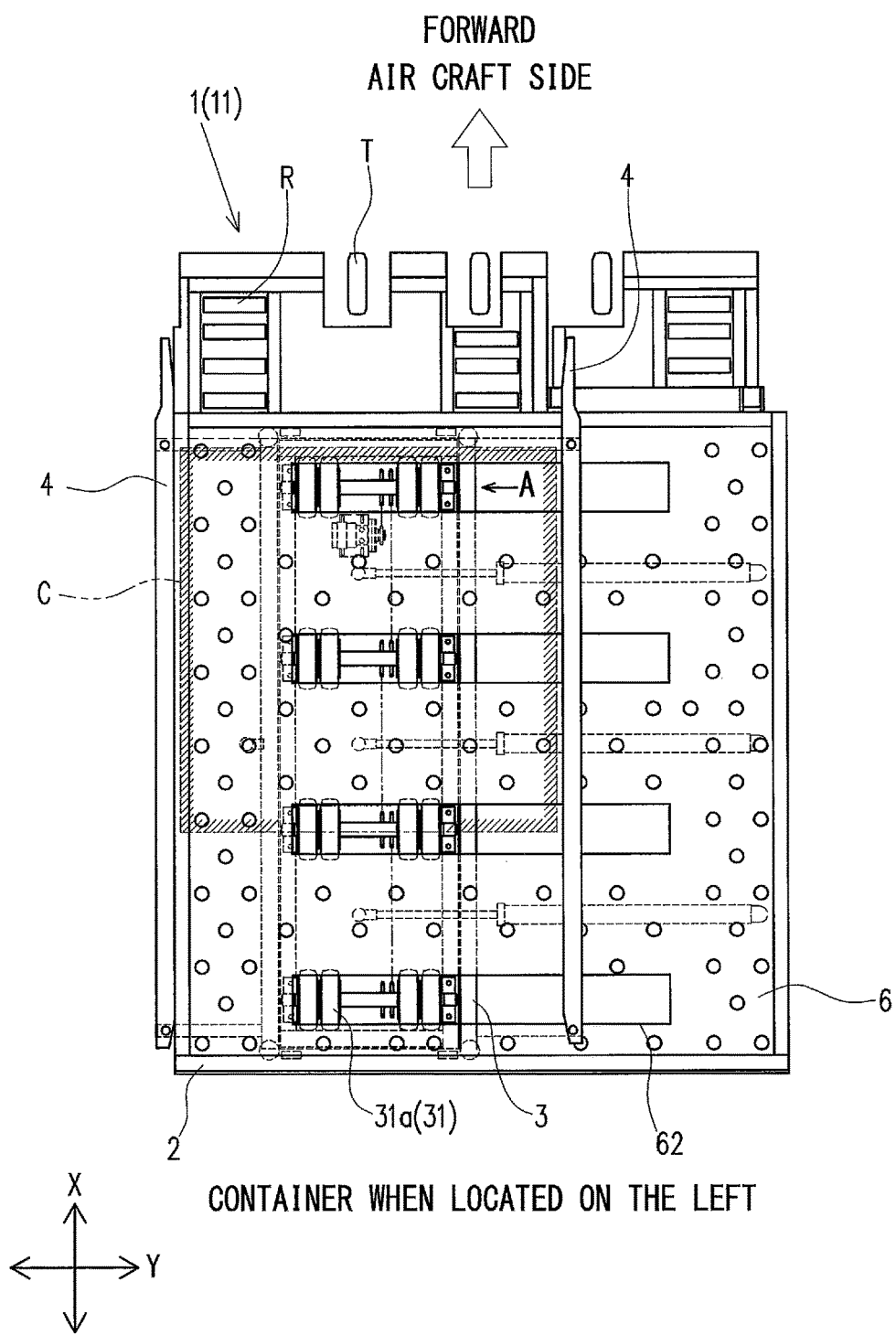
FIG. 11A is a plan view showing the front platform, in which the cargo (container) is located at the left end of the movement range.
Figure 11B:
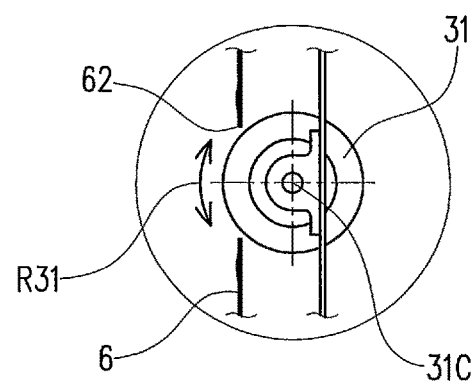
FIG. 11B is a schematic view as viewed in the direction of the arrow A in FIG. 11A.
Figure 12:
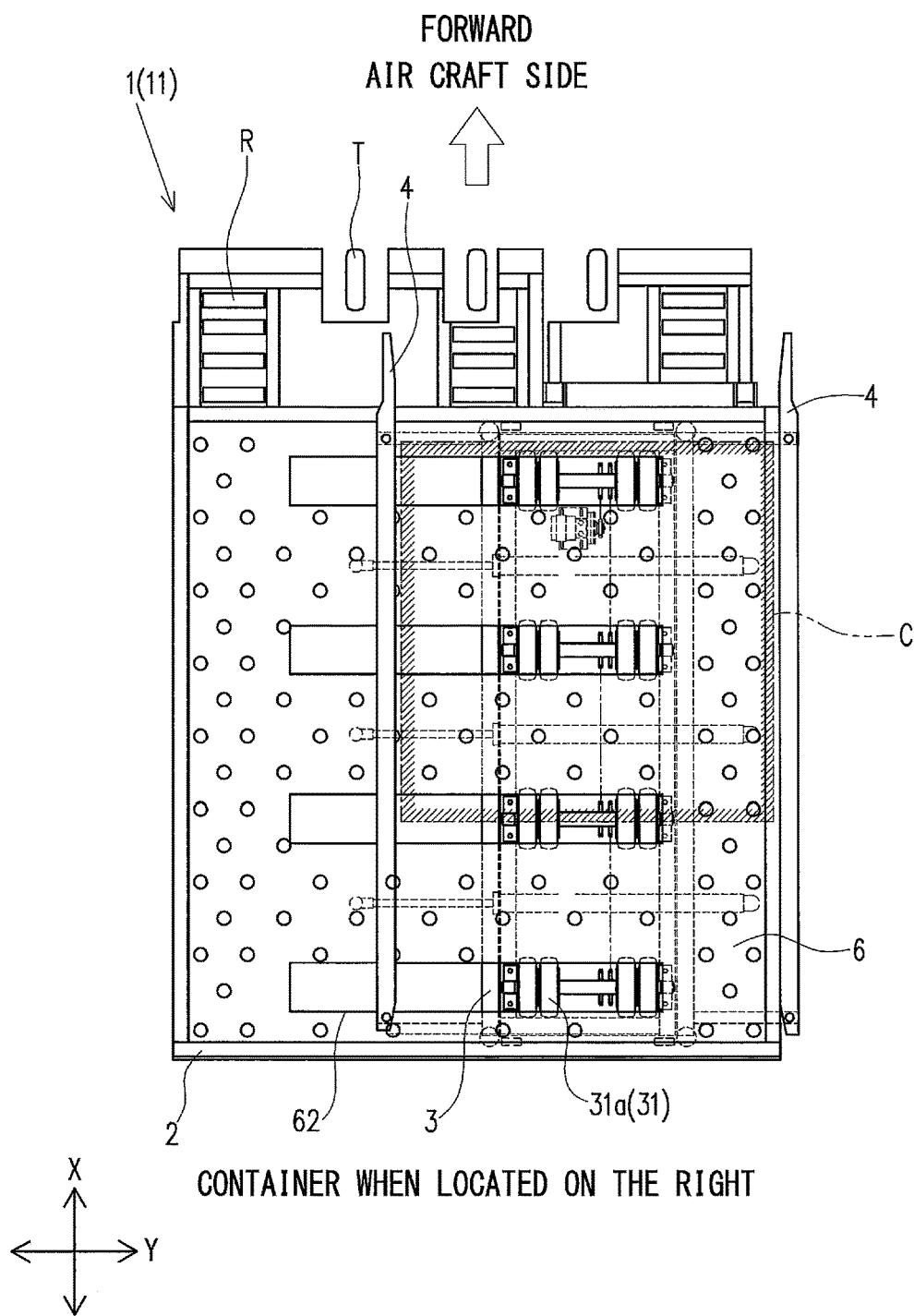
FIG. 12 is a plan view showing the front platform, in which the cargo (container) is located at the right end of the movement range.

Such a configuration of the conveying unit 3 allows the plurality of tires 31 to move in the left-right direction Y by the movement of the conveying unit 3 in the left-right direction Y. Accordingly, the container C placed on the tire units 31a also moves in the left-right direction Y. FIG. 10 shows the case where the conveying unit 3 and the container C are located at the center in the left-right direction Y of the elevating table 2. FIG. 11A shows the case where the conveying unit 3 and the container C are located at the left end in the left-right direction Y of the movement range. FIG. 12 shows the case where the conveying unit 3 and the container C are located at the right end in the left-right direction Y of the movement range.

Therefore, in the case where the container C is intended to be moved in the left-right direction Y, the container C can be moved together with the conveying unit 3. Accordingly, the need to move the container C vertically in order to lift the container C from rollers (which correspond to the tires 31 of this embodiment) configured to move the container C in the front-rear direction X once when the container C is intended to be moved in the left-right direction Y, as in conventional techniques, can be eliminated. That is, the procedure to move the container C once in the vertical direction that is a different direction in order to move the container C in the left-right direction Y can be omitted. Therefore, the container C can be easily carried to the loading-unloading part. Further, the time to move the container C vertically can be saved. Accordingly, the working efficiency is good, and the container C can be carried out of and into the cargo hold with a margin within the limited time from the landing to the take off of the aircraft A. Further, the need to provide a mechanism for the vertical movement can be eliminated, and therefore the structure of the front platform 11 can be simplified. Accordingly, the production cost and maintenance cost of the cargo carrying vehicle 1 may possibly be reduced.

It is also structurally possible to move the container C in the left-right direction Y while carrying it in the front-rear direction X at the same time. However, such a simultaneous movement is not employed in this embodiment, and the conveyance in the front-rear direction X and the movement in the left-right direction Y are separately performed in order to enhance the accuracy of the position adjustment in the left-right direction Y.

Further, when the supply of hydraulic oil is stopped, the oil pressure cylinders 37 can maintain the stretched state at the time. Therefore, the support 32 is immovable in the left-right direction Y after the container C is moved to a desired position in the left-right direction Y, so that the position is held. Depending on the model of the aircraft A, there may be cases where the width dimension of the loading-unloading port AO has no margin with respect to the width dimension of the container C. Further, there may be cases where the loading space becomes small in the cargo hold of the aircraft A at the last stage of loading operation, and a new container C needs to be carried into the space between a plurality of containers C that are closely located in the cargo hold. Even in such cases, the position of the support 32 is held after the movement to the desired position in the left-right direction Y, and therefore the container C can be carried to the loading-unloading port AO while the position in the left-right direction Y is maintained, so that the accuracy of the conveyance can be enhanced. Accordingly, the container C can be carried into the loading-unloading port AO that has a dimension with no margin or the space between the plurality of containers C by reliably adjusting the position of the container C. Moreover, the vertical movement of the container C as in conventional techniques can be eliminated, and therefore the time to position the container C can be reduced, so that rapid conveyance with high accuracy can be achieved.

Here, in order to allow the container C to be movable in the left-right direction Y that is the position adjusting direction, it is also conceivable to provide a mechanism (such as product name "Omni wheels" (registered trademark in Japan)) that is constituted by providing a group of a plurality of rollers arranged in directions intersecting each other so as to be rotatable and is capable of freely moving the container C back and forth, and left and right in the front platform 11, though not shown, other than employing the conveying unit 3 of this embodiment. However, in the mechanism using the "Omni wheels", it is difficult to hold the container C at a desired position, because a time lag may occur in rotations, or excessive rotation may occur due to inertia, and thus it has been difficult to employ such a mechanism in an application that requires position management with high accuracy such as the loading of the container C into the aircraft A. It is obvious that the cargo carrying vehicle 1 of this embodiment is excellent in that the position of the container C is held as described above, as compared with the case of employing the mechanism using the "Omni wheels".

Since the tires 31 of this embodiment are rubber tires, and at least portions in contact with the container C are made of rubber, the position of the container C in the left-right direction Y is held also by the friction between the container C and the tires 31. That is, the tires 31 function also as means that assists to hold the position of the container C.

Further, as shown in FIG. 5, the plurality of tires 31 of the conveying unit 3 are arranged in the support 32 within a range of a dimension W31 that is smaller than a width dimension WC of the cargo. Along with this, the dimension in the left-right direction Y of the support 32 of the conveying unit 3 is also smaller than the width dimension WC of the cargo. Therefore, the movable range in the left-right direction Y on the elevating table 2a is increased, as compared with the conveying unit 3 in which the plurality of tires 31 are arranged within a range of a dimension larger than the width dimension WC of the cargo. Thus, the coverage to the displacement in the left-right direction Y between the loading-unloading port AO and the container C is increased. Accordingly, the displacement in the left-right direction Y can be covered only by moving the conveying unit 3 in the left-right direction Y without readjusting the position of the cargo carrying vehicle 1 itself with respect to the loading-unloading port AO.

Further, the conveying unit 3 is configured to be movable within a range in which the pair of scissor link mechanisms 5 are opposed to each other (where the inner surfaces are opposed to each other) in the left-right direction Y. More specifically, the conveying unit 3 is configured to be movable within the range between the respective positions where the support 32 abuts the scissor link mechanisms 5. Therefore, the conveying unit 3 can be configured not to interfere with the scissor link mechanisms 5.

Further, the cargo carrying vehicle 1 of this embodiment includes guides 4. A pair of two rod-shaped bodies that are opposed to each other are used as the guides 4. As shown in FIG. 5, the pair of guides 4 are opposed to each other in the left-right direction Y at a spacing W4 that is larger than the width dimension WC of the cargo when they are mounted on the support 32. Further, the guides 4 are arranged at positions that are opposed to the lateral surfaces of the container C located on the support 32. That is, the pair of guides 4 are located so as to sandwich the container C in the left-right direction Y.

Each of the guides 4 is an elongated rod-shaped body extending in a linear direction. The spacing (W4) is constant in most part in the longitudinal direction of the pair of guides 4 when they are mounted on the support 32. Further, the spacing is increased at the front and rear ends, as shown in FIG. 4. Therefore, the container C when being carried in and out can be smoothly introduced to the position between the pair of guides 4. The pair of guides 4 allow the container C during the conveyance to be carried within a specific range in the left-right direction Y (position adjusting direction) without falling from the elevating table 2a.

Further, the pair of guides 4 are detachably attached to the support 32. Further, the pair of guides 4 are detachably attached to the elevating table 2a. FIG. 4 and FIG. 5 show the state where the pair of guides 4 are mounted on each of both the support 32 and the elevating table 2a. The detachment and attachment are performed by insertion and removal of parts of the guides 4 into and from the support 32 (the insertion holes 321a of the guide mounting brackets 321) or the elevating table 2a in the vertical direction. Therefore, the change in width of the container C can be covered by optionally attaching the guides 4 onto the support 32 or the elevating table 2a.

The pair of guides 4 can be configured to be head-swingable at an angle in the conveyance direction with respect to the support 32 or the elevating table 2a. For example, such a configuration can be achieved by pivotally supporting the rear portion of each guide 4 and connecting the oil pressure cylinders 37 or a link interlocked with the oil pressure cylinders 37 to the distal end portion. With such a configuration, for example, even when the conveyance direction in accordance with the tires 31 of the conveying unit 3 is not orthogonal to the loading-unloading port AO of the aircraft A and thus is slanted, in relation to the stop position of the cargo carrying vehicle 1 with respect to the aircraft A, the conveyance direction of the container C can be modified by head swinging of the distal end portions of the pair of guides 4, so that the container C can be sent to the loading-unloading port AO in the correct direction.

The elevating table 2a includes the ball mat 6 in which a plurality of spheres 61 rotatably supported around the entire circumference are arranged to be dispersed at the same height. The upper end positions of the plurality of spheres 61 in the ball mat 6 are located lower than the upper ends of the rotating bodies. The ball mat 6 does not interfere with the container C located on the conveying unit 3 in the normal state, and when the container C on the conveying unit 3 is deflected or inclined, the container C is supported by the ball mat 6 (particularly, the spheres 61). Therefore, the container C can be prevented from hindering the conveyance by rubbing the upper surface of the elevating table 2a.

In the range of the ball mat 6 where the tires 31 move in the left-right direction Y, a plurality (at 4 points in this embodiment) of tire through holes 62 passing through the ball mat 6 in the vertical direction are formed. The spheres 61 are not arranged in the tire through holes 62. The tire through holes 62 allow the tires 31 not to interfere with the ball mat 6. In the ball mat 6, through holes that prevent the interference with the guides 4 moving in the left-right direction Y together with the conveying unit 3 are also formed, but they are not shown in FIG. 10 to FIG. 12.

The aforementioned description will be summarized. The cargo carrying vehicle 1 according to this embodiment is capable of carrying a container C to a loading-unloading port AO provided in an aircraft A by being located adjacent to the loading-unloading port AO, the cargo carrying vehicle 1 including: an elevating table 2 elevatable in the vertical direction; a plurality of tires 31 located on the elevating table 2 and configured to rotate so as to carry the container C on the elevating table 2 in a front-rear direction X that is a direction toward the loading-unloading port AO; and a support 32 configured to support the plurality of tires 31, wherein the support 32 and the plurality of tires 31 constitute a conveying unit 3, and the conveying unit 3 is movable on the elevating table 2 in a left-right direction Y that is a direction intersecting the vertical direction and the front-rear direction X.

According to this configuration, in the case where the container C is intended to be moved in the left-right direction Y, the container C can be moved together with the conveying unit 3. Therefore, the need to vertically move the container C is eliminated. Accordingly, the container C can be easily carried to the loading-unloading port AO.

The cargo carrying vehicle 1 can further include an oil pressure cylinder 37 connected to the support 32 and configured to generate a driving force to move the support 32 in the left-right direction Y and to hold a position in the the left-right direction Y of the support 32 on the elevating table 2 after the support 32 is moved.

According to this configuration, the position of the support 32 is held after the movement to the desired position in the left-right direction Y, and therefore the container C can be carried to the loading-unloading port AO while the position in the left-right direction Y is maintained, so that the accuracy of conveyance can be enhanced.

The cargo carrying vehicle 1 can further include a pair of guides 4 opposed to each other in the left-right direction Y at a spacing W4 larger than a width dimension WC of the container C and arranged at positions opposed to lateral surfaces of the container C located on the the support 32.

According to this configuration, the pair of guides 4 can carry the container C during the conveyance within a specific range in the left-right direction Y.

The cargo carrying vehicle 1 can be configured so that the elevating table 2 includes a ball mat 6 in which a plurality of spheres 61 supported rotatably around an entire circumference are arranged at the same height, and upper end positions of the plurality of spheres 61 of the ball mat 6 are located lower than upper ends of the rotating bodies.

According to this configuration, the ball mat 6 does not interfere with the container C located on the conveying unit 3 in the normal state, and when the container C on the conveying unit 3 is deflected or inclined, the container C is supported by the ball mat 6. Therefore, the container C can be prevented from hindering the conveyance by rubbing the upper surface of the elevating table 2a.

As described above, the cargo carrying vehicle 1 according to this embodiment eliminates the need to vertically move the container C, and therefore the cargo can be easily carried to the loading-unloading port AO of the aircraft A. Accordingly, the working efficiency when carrying cargo is good.

Hereinbefore, an embodiment of the present invention has been described. However, the present invention is not limited to the aforementioned embodiment, and various modifications can be made without departing from the gist of the present invention.

For example, the object to be loaded with the cargo is not limited to the aircraft and may be movable bodies such as ships, railway vehicles, and freight cars. Further, the object may be buildings fixed on the ground such as warehouses.

Further, the cargo carrying vehicle 1 of the aforementioned embodiment is a self-propelled vehicle, but there is no limitation to this configuration, and the cargo carrying vehicle 1 can be a vehicle that is towed or pushed by a self-propelled vehicle without including a power source for running.

Further, the conveyance direction (the front-rear direction X in the aforementioned embodiment) and the position adjusting direction (the left-right direction Y in the aforementioned embodiment) are not limited to those having a relationship orthogonal to each other as in the aforementioned embodiment and can have a relationship intersecting each other at an angle other than 90 degrees.

Further, the rubber tires are used as the rotating bodies 31 in the aforementioned embodiment, but there is no limitation to this configuration, and various rotating devices such as rollers made of steel can be used therefor. However, the rotating devices configured to rotate around the entire circumference like the spheres 61 constituting the ball mat 6 are not preferable since it is difficult to position the cargo on the support 32, and rotating devices that rotate in a fixed direction are preferable.

Further, the bottom surface of the cargo is configured to directly contact the tires 31 serving as the rotating bodies in the aforementioned embodiment, but there is no limitation to this configuration. For example, by coupling a plurality of rotating bodies to each other with a belt to form an infinite orbit, the bottom surface of the cargo may be configured to contact the belt, so that the cargo does not directly contact the rotating bodies.

In the case of using rotating bodies, such as rollers made of steel, that have a smaller coefficient of surface friction than the tires made of rubber, friction increasing means such as rubber coating can be applied to the surface, in order to reduce the displacement in the position adjusting direction of the cargo.

Further, the hydraulic motor is used as a driving source for driving the tires 31 in the aforementioned embodiment, but various devices such as electric motors can be employed therefor. Further, a chain is used as the driving force transmitting device connecting the driving source to the shaft 34 in the aforementioned embodiment, but various devices such as gears, belts, and shafts can be employed therefor. Further, the driving source can be connected directly to the shaft 34 without using such a driving force transmitting device.

Further, the tires 31 of the aforementioned embodiment are configured to move the cargo in the front-rear direction X by being rotated by the driving force of the hydraulic motor, but the configuration can be such that the tires themselves are not driven and merely support the cargo movably, and the cargo is moved by a separately provided pressing device or drawing device, or human power.

Further, the drive unit for moving the support 32 in the position adjusting direction (the left-right direction Y in the aforementioned embodiment) is not limited to the oil pressure cylinders 37 of the aforementioned embodiment and can be constituted by combining a driving source such as hydraulic motors or electric motors (such as rotary motors or linear motors) with a transmitting device such as chains, gears, and links configured to transmit the driving force of the driving source to the support 32. Further, the three oil pressure cylinders 37 are provided in the aforementioned embodiment, but the number thereof can be appropriately changed in the implementation, and only one oil pressure cylinder, for example, may be used in the implementation.

What is claimed is:

1. A cargo carrying vehicle capable of carrying cargo to a loading-unloading part provided in an object to be loaded with the cargo by being located adjacent to the loading-unloading part, the cargo carrying vehicle comprising:

an elevating table elevatable in the vertical direction and having an upper surface on which the cargo is carried;

first rotating bodies located on the elevating table and configured to rotate so as to carry the cargo on the elevating table in a conveyance direction that is a direction toward the loading-unloading part; and a support frame configured to support the first rotating bodies, wherein the support frame and the first rotating bodies constitute a conveying unit, the conveying unit comprises second rotating bodies configured to move straight while rotating on the elevating table in a position adjusting direction that is a direction intersecting the vertical direction and the conveyance direction, the first rotating bodies and the second rotating bodies are supported by the support frame, and the conveying unit moves in the position adjusting direction relative to the elevating table to move the first rotating bodies in the position adjusting direction along the upper surface of the elevating table.

2. The cargo carrying vehicle according to claim 1, further comprising:

a drive unit connected to the support frame and configured to generate a driving force to move the support frame in the position adjusting direction and to hold a position in the position adjusting direction of the support frame on the elevating table after the support frame is moved.

3. The cargo carrying vehicle according to claim 1, further comprising:

a pair of guides opposed to each other in the position adjusting direction at a spacing larger than a width dimension of the cargo and arranged at positions opposed to lateral surfaces of the cargo located on the support frame.

4. The cargo carrying vehicle according to claim 1, wherein the elevating table comprises a ball mat in which a plurality of spheres supported rotatably around an entire circumference are arranged at the same height, and upper end positions of the plurality of spheres of the ball mat are located lower than upper ends of the first rotating bodies.

5. The cargo carrying vehicle according to claim 1, wherein the position adjusting direction is a direction orthogonal to the vertical direction and the conveyance direction.

6. The cargo carrying vehicle according to claim 1, wherein the second rotating bodies comprise: horizontal axes rotating bodies each having a rotation axis in the horizontal direction; and vertical axes rotating bodies each having a rotation axis in the vertical direction, and the first rotating bodies, the horizontal axes rotating bodies, and the vertical axes rotating bodies are supported by the support frame.

7. The cargo carrying vehicle according to claim 1, wherein the support frame comprises: a drive motor configured to drive the first rotating bodies; and a chain configured to transmit a driving force from the drive motor to the first rotating bodies.

8. The cargo carrying vehicle according to claim 2, wherein the drive unit comprises an oil pressure cylinder.

9. The cargo carrying vehicle according to claim 1, comprising a plurality of elevating tables elevatable in the vertical direction, the plurality of elevating tables being elevatable independently of each other, wherein out of the plurality of elevating tables, an elevating table closest to the loading-unloading part comprises the conveying unit.

10. The cargo carrying vehicle according to claim 1, wherein conveying rollers or carrying tires project on an upper surface of the elevating table at a position closer to the loading-unloading part than the conveying unit.

11. The cargo carrying vehicle according to claim 1, wherein the support frame has a single layer framework.

12. A cargo carrying vehicle capable of carrying cargo to a loading-unloading part provided in an object to be loaded with the cargo by being located adjacent to the loading-unloading part, the cargo carrying vehicle comprising:

an elevating table elevatable in the vertical direction;

first rotating bodies located on the elevating table and configured to rotate so as to carry the cargo on the elevating table in a conveyance direction that is a direction toward the loading-unloading part; and a support frame configured to support the first rotating bodies, wherein the support frame and the first rotating bodies constitute a conveying unit, the conveying unit comprises second rotating bodies configured to move straight while rotating on the elevating table in a position adjusting direction that is a direction intersecting the vertical direction and the conveyance direction, the first rotating bodies and the second rotating bodies are supported by the support frame, and the conveying unit moves in the position adjusting direction relative to the elevating table to move the cargo in the position adjusting direction.

* * * * *